United States Patent [19]

Phillips

[11] 3,925,299

[45] Dec. 9, 1975

[54] ANHYDRIDE ACRYLIC COPOLYMERS AS ADDITIVES FOR UNSATURATED POLYESTER MOLDING COMPOSITIONS

[75] Inventor: Thomas Richard Phillips, Belpre, Ohio

[73] Assignee: E. I. Du Pont de Nemours and Company, Wilmington, Del.

[22] Filed: Dec. 17, 1973

[21] Appl. No.: 425,073

[52] U.S. Cl. .......................... 260/40 R; 260/862
[51] Int. Cl.² ............... C08L 33/12; C08L 67/06
[58] Field of Search ..................... 260/862, 40 R

[56] References Cited
UNITED STATES PATENTS

| | | | |
|---|---|---|---|
| 3,207,816 | 9/1965 | Dugliss et al. | 260/862 X |
| 3,389,192 | 6/1968 | Ziegler | 260/862 |
| 3,449,468 | 6/1969 | Vrotney | 260/862 |
| 3,673,148 | 6/1972 | Vasta | 260/862 X |
| 3,701,748 | 10/1972 | Kraekel | 260/862 X |
| 3,780,141 | 12/1973 | Jin et al. | 260/862 X |

FOREIGN PATENTS OR APPLICATIONS

| | | | |
|---|---|---|---|
| 887,693 | 12/1971 | Canada | 260/862 |

*Primary Examiner*—Donald E. Czaja
*Assistant Examiner*—S. M. Person

[57] ABSTRACT

A resin composition of (1) a polyester, (2) an ethylenically unsaturated monomer, and (3) a thermoplastic polymer containing methacrylate units, units of ethyl acrylate, n-butylmethacrylate, isobutylmethacrylate or mixtures thereof, and units of maleic anhydride, itaconic anhydride or mixtures thereof. The resin is useful in making molded products where an esthetically smooth appearance is desired and where tolerance of the parts is important such as in automobile body parts, appliance surfaces and the like.

6 Claims, No Drawings

ANHYDRIDE ACRYLIC COPOLYMERS AS ADDITIVES FOR UNSATURATED POLYESTER MOLDING COMPOSITIONS

This invention is directed to polyester containing resins. More particularly, it is directed to a resin mixture of the polyester, an ethylenically unsaturated monomer, and selected thermoplastic copolymers. It is further directed to a method of producing molded parts from the resins, and to shaped articles made from the resins.

It is known in the art from Belgian Patent No. 740,581 to produce resin mixtures containing (1) a polyester of an alpha, beta-ethylenically unsaturated dicarboxylic acid and a dihydric alcohol, (2) an ethylenically unsaturated monomer such as styrene and (3) a thermoplastic copolymer that is soluble in a mixture of the polyester and the monomer and which contains acid functional groups. These resin mixtures may contain metal oxides or metal hydroxides which serve to thicken the mixtures, apparently by ionically reacting with the acid functional groups of both the polyester and thermoplastic polymers. These resin mixtures can contain fibrous reinforcing material, such as glass fiber, and inert filler, such as calcium carbonate.

The present invention is an improvement over the resin mixtures disclosed in Belgian Patent No. 740,581. In carrying out the disclosure of the Belgian Patent in some commercial operations, the resin mixture, combined with an alkali earth metal oxide or hydroxide is applied to a continuous polyethylene sheet, short glass fibers are then spread on the resin, and then an additional layer of the resin mixture with the additives is applied. Finally, a polyethylene sheet is placed on top. The components between the sheets are then mechanically worked to a sufficient degree that the glass fibers are thoroughly wetted with the resin mixture and the glass is substantially uniformly dispersed throughout the resin mixture. This working is often accomplished by passing the mixture enclosed between the two polyethylene sheets through pinch rolls, around sharp bends and the like. The resulting product is sufficiently stable that it may be stored for considerable periods of time without polymerizing to a solid intractable thermoset mass.

The presence of the thermoplastic copolymer in the resin mixture accomplishes two results; namely, it reduces the tendency of the resin mixture to shrink when it is molded by the thermosetting techniques (thus allowing use in applications where close tolerances are necessary) and its acid functional groups react with the alkali metal oxide or hydroxide to aid in thickening the mixture so that it may be stored in relatively form stable condition.

In order to reduce as far as possible the tendency of the resin mixture to shrink during the thermosetting reaction, the thermoplastic copolymer should have as high a molecular weight as possible; however, because it is necessary to wet the glass fibers with the resin mixture and to have the glass fibers substantially uniformly dispersed throughout the resin mixture during working, it is desirable to have as low an apparent viscosity, i.e., low molecular weight, as possible. The thermoplastic copolymers used and described in the Belgian Patent contain acid groups, and the copolymer has a considerably higher initial apparent viscosity than would be predicted merely on the basis of molecular weight — this difference is thought to be at least in part, due to the hydrogen bonding of the acid groups. Thus, by following the teaching of this prior art, one is unable to obtain a minimum degree of shrinkage in the molding step, and at the same time have the maximum low viscosity desirable for easily combining the ingredients.

It has now been discovered that a high molecular weight thermoplastic copolymer may be employed, thus insuring low shrinkage, without the disadvantages of increased difficulty of wetting the fibers caused by high viscosity. This result is achieved by using a particular class of thermoplastic copolymers, namely, a copolymer that contains (1) polymerized methylmethacrylate units (2) polymerized units selected from the groups consisting of ethyl acrylate, n-butyl methacrylate and isobutylmethacrylate and (3) polymerized units selected from the group consisting of maleic anhydride and itaconic anhydride. Preferably, the thermoplastic copolymer contains between 69 and 94% by weight methylmethacrylate units, between 5 and 25% by weight polymerized ethyl acrylate, n-butylmethacrylate or isobutylmethacrylate units and 0.5 to 6% by weight polymerized maleic anhydride or itaconic anhydride units.

The thermoplastic copolymer has an inherent viscosity between about 0.04 and 2.0, corresponding to a molecular weight of between about 5,000 and 300,000. Preferably, the inherent viscosity is between 0.24 and 1.0 as measured at 20°C. in chloroform at a polymer concentration of 0.5% by weight, corresponding to a molecular weight of between about 25,000 and 160,000.

Because the thermoplastic copolymer contains anhydride groups rather than acid groups, the apparent viscosity of the copolymer in the mixture is lower initially as there is no acidic hydrogen to cause hydrogen bonding between different molecules of the copolymer or hydrogen bonding between copolymer molecule and the polyester molecules. However, the advantage of the acid functional groups in the copolymer is retained; this advantage being a thickening reaction that takes place between the alkaline earth oxide or hydroxide and the acid groups. The anhydride can react directly with the oxide or hydroxide to thicken the mixture, but the rate of thickening is usually increased by adding a small amount of water or alcohol to the resin mixture. In this instance, the anhydride groups of the thermoplastic copolymer hydrolyze, forming acid groups which then react with the alkaline earth oxide or hydroxide. The amount of water or alcohol added depends on the speed of reaction desired, but in general will be in the range of about 1 to 5 moles per mole of anhydride to be hydrolyzed. Because hydrolysis of the anhydride is a relatively slow reaction, the water or alcohol may be added prior to mixing the resin mixture with the alkaline earth oxide or hydroxide, and then that mixture combined with the glass fibers. Suitable alcohols for the hydrolysis of the anhydride include ethylene glycol, propylene glycol and diethylene glycol.

The thermoplastic copolymer may be made using the well known free-radical polymerization techniques of the art. A preferred reaction technique is the process disclosed in British Patent No. 1,286,600, issued Dec. 18, 1972.

The other components of the resin mixture are conventional ones. The polyester component is made up of the reaction product of a polyhydric alcohol and an alpha,beta-ethylenically unsaturated dicarboxylic acid.

Such polyesters are disclosed in Belgian Patent No. 740,581. Preferably, the polyester contains on a molar basis, slightly more acid than alcohol.

The ethylenically unsaturated monomer is usually styrene, although other monomers such as vinyl styrene, tertbutyl styrene and methyl methacrylate can be employed.

Preferably, the alpha,beta-ethylenically unsaturated polyester is present in the three-component resin mixture in an amount between 20 and 80% by weight of the mixture, and the ethylenically unsaturated monomer is preferably present in the resin mixture in an amount between 20 and 80% by weight of the mixture, while the thermoplastic copolymer is preferably present in an amount between 1 and 25% by weight of the mixture.

The amount of alkaline earth metal oxide or hydroxide employed to thicken the three-component resin mixture may vary over wide limits, but generally an amount between 0.5 and 10% by weight of the mixture is employed.

The amount of fibrous reinforcing filler added to the resin mixture may also vary over wide limits depending on the kind of fibrous material employed and the amount of reinforcement needed for the molded part, but, in general, the amount of fibrous reinforcing filler will be within the range of about 10% to 40% by weight of the total mixture to be molded. The various fibrous reinforcing materials known in the art may be employed. These include glass fibers, sisal, asbestos, metal fibers, and synthetic organic fibers, such as nylon, polypropylene and polyester. The generally preferred fiber of the art is glass fiber having a maximum length of about 2 inches. In addition, other fillers such as calcium carbonate can be used. Further, to ensure good mold release, agents such as zinc stearate can be employed if desired.

The three-component resin mixture along with the thickening agent and reinforcing filler is ultimately cured by heat. The curing reaction requires a free-radical catalyst. Various catalysts are well known in this art. However, the peroxide catalysts are generally preferred. The particular catalyst and the amount employed will depend on the desired cure time and cure temperature, but at normal curing temperatures of about 275° to 350°F. and pressures of about 30,000 lbs. to 100,000 lbs. about 0.01 to 5.0% by weight of the resin mixture is sufficient to cure the resin.

Particular catalysts found to be useful in this art are tert-butyl perbenzoate, benzoyl peroxide, cyclohexanone peroxide, lauryl peroxide, butylbenzene hydroperoxide, methylethyl ketone peroxide, and the azo catalysts such as alpha, alpha-azobis-isobutyronitrile.

In the following examples, all parts and percentages are in parts by weight unless otherwise specified.

EXAMPLE I

Forty-five parts of a polymer solution consisting of (1) 66% styrene monomer and (2) 34% of a thermoplastic copolymer consisting of 76 parts methylmethacrylate, 21 parts of isobutylmethacrylate and 3 parts of maleic anhydride having an inherent viscosity of 0.5, measured at 20°C. In chloroform at a polymer concentration of 0.5% by weight was mixed with 55 parts of a commercially available polyester/styrene solution (GR 63003, from W. R. Grace Co.). This polyester/styrene solution contained about 66% by weight polyester and had a Brookfield solution viscosity of 1200 centipoise measured at 20 revolutions per minute at 77°F. The polyester was formed of maleic acid units and propylene glycol units.

To 22.5 parts of the resin mixture prepared above was added 56.3 parts of calcium carbonate and 0.7 parts of zinc stearate. This composition was blended with a sigma blade mixer until a smooth paste was formed, then 20.3 parts of ¼ inch length glass fibers and 0.2 part tert-butyl perbenzoate was added. The mixing was continued until the glass fibers were satisfactorily dispersed. The mixture was removed from the mixer and wrapped in polyethylene film until molded.

The mixture was molded into a molded part by compression molding in a test mold at 300°C. for 120 seconds at 40,000 lbs. pressure. The test mold had a 6 inch by 6 inch cavity. The cavity was .40 inch deep along the full six inch width of one side. The .40 inch deep portion extended 1 ¾ inch in the other direction. The remainder of the cavity was ¼ inch deep except for a ½ inch wide 4 inch long slot that extended at a right angle from the mid-point of the edge of the mold cavity furthest removed from the 0.40 inch deep portion toward the 0.40 inch deep portion, and ended ¼ inch from the 0.40 inch deep portion. The bottom of the slot was an inclined plane extending from the bottom surface of the ¼ inch deep portion to a depth of ⅜ inch deeper than the ¼ inch deep portion at the end furthest removed from the 0.40 inch deep portion. The charge to the mold was 200 grams. The molded part had the form of a chip, a step and a rib.

The linear shrinkage of the part after cooling to room temperature was measured in a template which read directly in mils of shrinkage as compared to the mold at room temperature, and was converted to 0.8 mil per inch. By visual inspection, the surface of the part was determined to be good i.e., there was no surface waviness or sink over the rib.

In place of the isobutylmethacrylate can be used n-butylmethacrylic or ethyl acrylate.

EXAMPLE II

Example I was repeated except that a thermoplastic copolymer consisting of 77 parts methylmethacrylate, 21 parts is isobutyl methacrylate, and 2 parts of itaconic anhydride and having an inherent viscosity of 0.35 as measured at 20°C. in chloroform at a polymer concentration of 0.5% by weight was used in place of the thermoplastic copolymer used in Example I. The resulting molded part had a linear shrinkage of 1.0 mil per inch measured at room temperature. Visual inspection of the part determined that the surface of the part was good: There was no surface waviness or sink over the rib.

Comparative Example A

Example I was repeated except that the thermoplastic copolymer used was composed of 94.5 parts of methylmethacrylate and 4.5 parts of ethyl acrylate and had an inherent viscosity of 0.40 measured at 20°C. in chloroform at a polymer concentration of 0.5% by weight.

The molded part had a linear shrinkage of 1.2 mils per inch measured at room temperature. Visual inspection of the part determined that the surface of the part was good: There was no surface waviness or sink over the rib.

Comparative Example B

Example I was repeated except that the thermoplastic copolymer used was composed of about 76 parts methylmethacrylate, about 21 parts isobutyl methacrylate and about 3 parts methacrylic acid and had an inherent viscosity of 0.5 measured at 20°C. in chloroform at a polymer concentration of 0.5% by weight.

The molded part had a linear shrinkage of 1.2 mils per inch measured at room temperature. Visual inspection of the part determined that the surface of the part was good: There was no surface waviness or sink over the rib.

Comparative Example C

Example I was repeated except that no thermoplastic copolymer was used. The resulting molded part had a linear shrinkage of 4.9 mils per inch measured at room temperature. Visual inspection of the part determined that the surface of the part was poor: There was surface waviness and sink over the rib.

The preceeding representative examples may be varied within the scope of the disclosure herein, as understood and practiced by one skilled in the art, to achieve substantially the same results.

The foregoing detailed description has been given for clearness of understanding only and no unnecessary limitations are to be understood therefrom. The invention is not limited to the exact details shown and described for obvious modifications will occur to those skilled in the art.

The embodiments of this invention in which an exclusive property or privilege is claimed are defined as follows:

1. In a composition useful for bulk molding and sheet molding which comprises (a) 20 to 80% by weight of an alpha,beta-ethylenically unsaturated polyester, (b) 20 to 80% by weight of an ethylenically unsaturated monomer and (c) 1 to 25% by weight of a thermoplastic copolymer which is soluble in mixtures of (a) and (b), an improvement which comprises employing as the thermoplastic copolymer, a copolymer containing (1) polymerized methylmethacrylate units, (2) polymerized units selected from the group consisting of ethyl acrylate, n-butylmethacrylate, isobutylmethacrylate, and (3) polymerized units selected from the group consisting of maleic anhydride and itaconic anhydride.

2. The composition of claim 1 in which the thermoplastic copolymer is 69 to 94% by weight methylmethacrylate units, 5 to 25 percent polymerized units selected from the class consisting of ethyl acrylate, n-butylmethacrylate, isobutylmethacrylate and mixtures thereof, and 1 to 6% by weight of polymerized units selected from the class consisting of maleic anhydride, itaconic anhydride, and mixtures thereof.

3. The composition of claim 2 in which the thermoplastic copolymer is a terpolymer of methylmethacrylate, isobutylmethacrylate and maleic anhydride.

4. The composition of claim 1 which additionally contains an alkaline earth metal oxide or hydroxide, and an inert filler and a fibrous reinforcing filler.

5. The composition of claim 1 in which the thermoplastic copolymer has a molecular weight of 25,000 to 160,000.

6. A shaped article comprising the composition of claim 1 in cured form.

* * * * *